(12) United States Patent
Helin et al.

(10) Patent No.: US 8,874,811 B2
(45) Date of Patent: Oct. 28, 2014

(54) SYSTEM AND METHOD FOR PROVIDING A FLEXIBLE BUFFER MANAGEMENT INTERFACE IN A DISTRIBUTED DATA GRID

(71) Applicant: Oracle International Corporation, Redwood Shores, CA (US)

(72) Inventors: Charlie Helin, New York, NY (US); Mark Falco, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/671,441

(22) Filed: Nov. 7, 2012

(65) Prior Publication Data

US 2014/0108681 A1    Apr. 17, 2014

Related U.S. Application Data

(60) Provisional application No. 61/714,100, filed on Oct. 15, 2012.

(51) Int. Cl.

| | |
|---|---|
| *G06F 13/368* | (2006.01) |
| *G06F 17/30* | (2006.01) |
| *G06F 5/06* | (2006.01) |
| *H04L 29/08* | (2006.01) |
| *G06F 12/02* | (2006.01) |
| *G06F 9/50* | (2006.01) |
| *H04L 12/26* | (2006.01) |
| *G06F 9/54* | (2006.01) |
| *H04L 12/937* | (2013.01) |
| *H04L 12/24* | (2006.01) |

(52) U.S. Cl.
CPC .... *G06F 17/30371* (2013.01); *G06F 17/30067* (2013.01); *G06F 5/065* (2013.01); *H04L 67/10* (2013.01); *G06F 12/0253* (2013.01); *G06F 9/5072* (2013.01); *H04L 43/0811* (2013.01); *H04L 41/0668* (2013.01); *G06F 9/546* (2013.01); *H04L 49/253* (2013.01)
USPC ................................................ 710/56; 710/33

(58) Field of Classification Search
None
See application file for complete search history.

(56) References Cited

U.S. PATENT DOCUMENTS

| | | | | |
|---|---|---|---|---|
| 5,014,265 | A | * | 5/1991 | Hahne et al. ................... 370/236 |
| 5,301,350 | A | * | 4/1994 | Rogan et al. ..................... 705/33 |
| 5,784,698 | A | * | 7/1998 | Brady et al. ................... 711/171 |
| 6,070,202 | A | * | 5/2000 | Minkoff et al. .................. 710/56 |
| 6,338,112 | B1 | * | 1/2002 | Wipfel et al. .................. 710/269 |
| 6,826,597 | B1 | | 11/2004 | Lonnroth et al. |
| 8,131,894 | B2 | * | 3/2012 | Cain et al. ........................ 710/52 |
| 2004/0083317 | A1 | | 4/2004 | Dickson et al. |
| 2006/0112174 | A1 | | 5/2006 | L'Heureux et al. |
| 2006/0129516 | A1 | | 6/2006 | Bradford et al. |

(Continued)

OTHER PUBLICATIONS

Tanenbaum, Modern Operating Systems, 2001, Prentice-Hall, pp. 1-5.*

*Primary Examiner* — Cheng-Yuan Tseng (74) *Attorney, Agent, or Firm* — Meyer IP Law Group (57) ABSTRACT

A system and method can provide a flexible buffer management interface in a distributed data grid. The buffer manager in the distributed data grid can receive a request from a requester for a buffer in the distributed data grid, wherein the request contains at least one parameter that provides an indication on the size of the requested buffer. Then, the buffer manager can allocate a buffer based on the indication in the request and provide the allocated buffer to the requester, wherein an actual size of the buffer is determined by the buffer manager.

18 Claims, 4 Drawing Sheets

(56) References Cited

U.S. PATENT DOCUMENTS

| | | |
|---|---|---|
| 2007/0168336 A1 | 7/2007 | Ransil et al. |
| 2010/0017461 A1* | 1/2010 | Kokkevis et al. ............. 709/203 |
| 2010/0037222 A1 | 2/2010 | Tatsubori et al. |
| 2010/0060934 A1* | 3/2010 | Bellert ......................... 358/1.17 |
| 2011/0004701 A1 | 1/2011 | Panda et al. |
| 2011/0225122 A1 | 9/2011 | Denuit et al. |
| 2012/0197959 A1* | 8/2012 | Oliver et al. .................. 709/201 |
| 2012/0198455 A1* | 8/2012 | Lee et al. ...................... 718/100 |
| 2012/0331029 A1 | 12/2012 | King, III et al. |

\* cited by examiner

SYSTEM AND METHOD FOR PROVIDING A FLEXIBLE BUFFER MANAGEMENT INTERFACE IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

CROSS-REFERENCED APPLICATIONS

The current application hereby incorporates by reference the material in the following patent applications:

U.S. patent application Ser. No. 13/671,479, entitled "SYSTEM AND METHOD FOR SUPPORTING SMART BUFFER MANAGEMENT IN A DISTRIBUTED DATA GRID" by inventors Charlie Helin and Mark Falco, filed Nov. 7, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

BACKGROUND

Modern computing systems, such as those employed by larger organizations and enterprises, continue to increase in size and become more complex. Particularly, in areas such as Internet applications, there is an expectation that a large number of users should be able to simultaneously access that application. This effectively leads to an exponential increase in the amount of content generated and consumed by users. Thus, these activities can result in a corresponding increase in the number of transaction calls to databases and metadata stores, which have a limited capacity to accommodate that demand.

This is the general area that embodiments of the invention are intended to address.

SUMMARY

Described herein is a system and method that can provide a flexible buffer management interface in a distributed data grid. A buffer manager in the distributed data grid can receive a request from a requester for a buffer in the distributed data grid, wherein the request contains at least one parameter that provides an indication on the size of the requested buffer. Then, the buffer manager can allocate a buffer based on the indication in the request and provide the allocated buffer to the requester, wherein an actual size of the buffer is determined by the buffer manager.

DETAILED DESCRIPTION

Described herein is a system and method that can provide a flexible buffer management interface in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
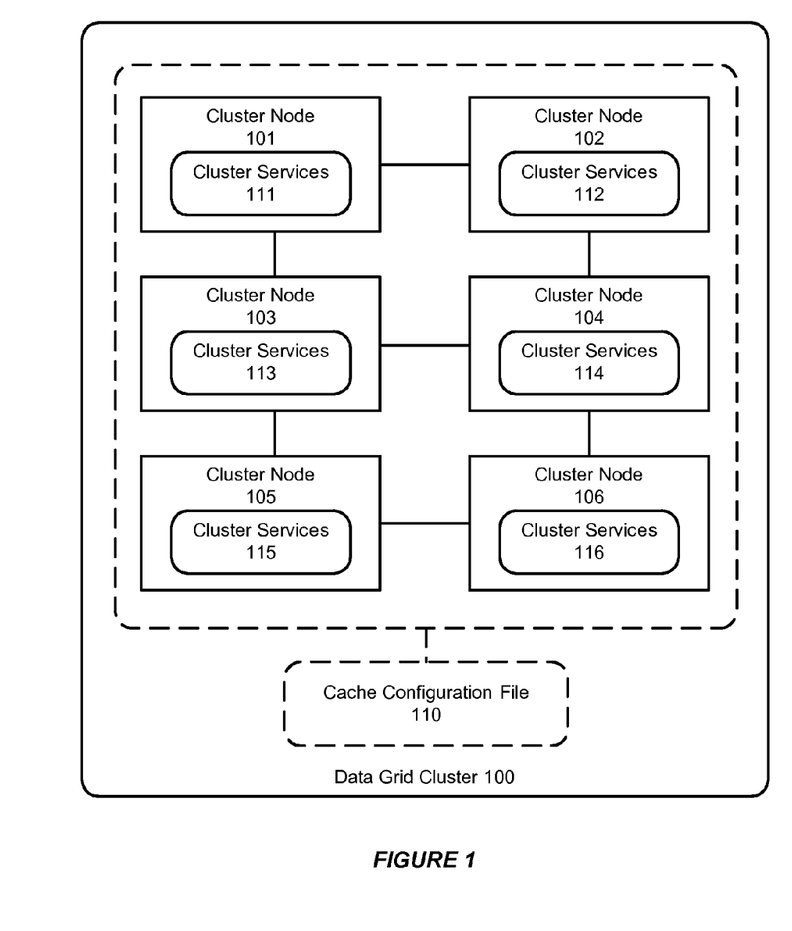
FIG. 1 is an illustration of a data grid cluster in accordance with various embodiments of the invention.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

A Flexible Buffer Management Interface

In accordance with an embodiment of the invention, the data grid cluster can provide a flexible buffer management interface that can be used by various applications for different purposes, such as supporting network Input/Output (I/O) and performing object serialization.

Figure 2:
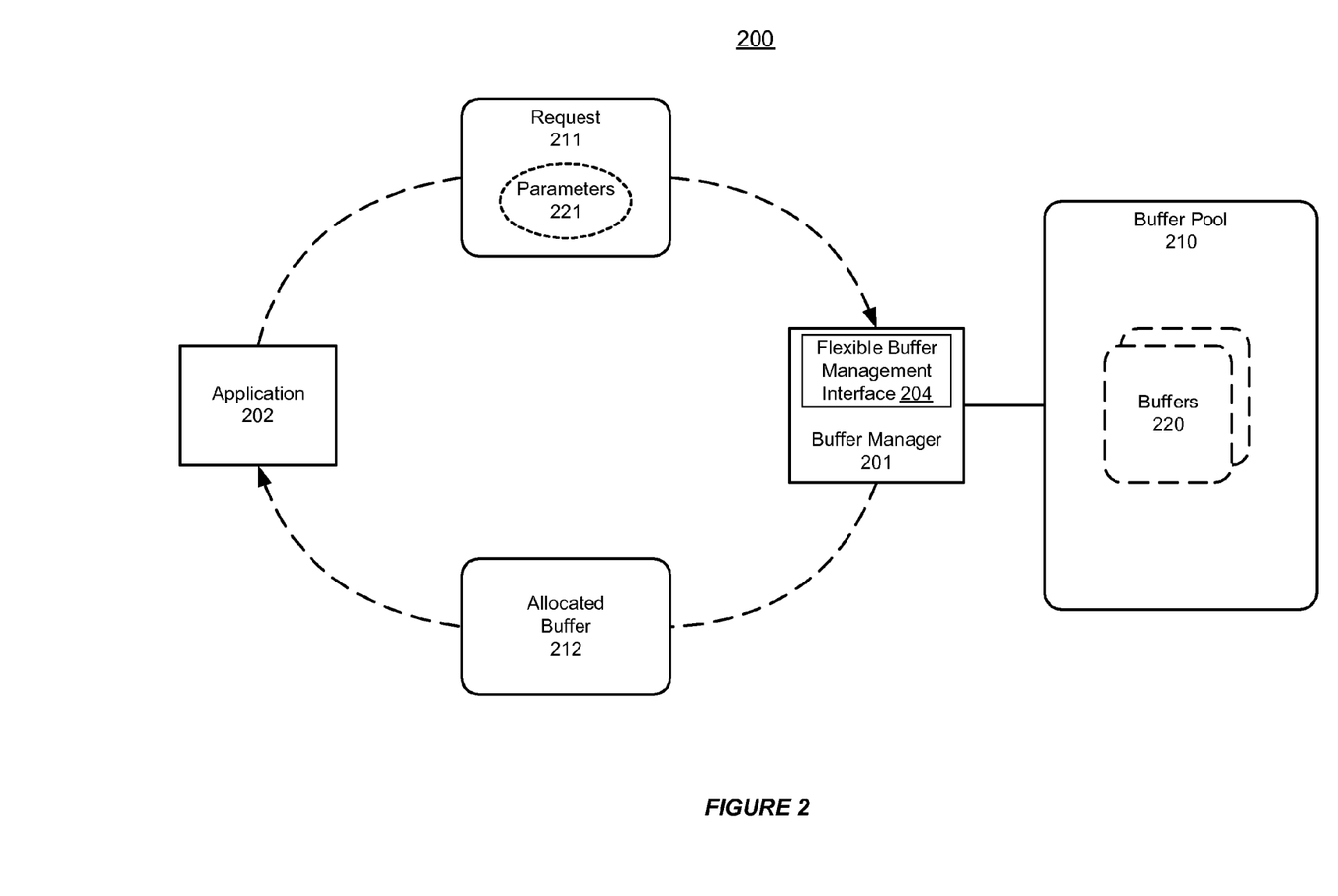
FIG. 2 shows an illustration of handling a buffer request in a data grid cluster, in accordance with an embodiment of the invention.

FIG. 2 shows an illustration of handling a buffer request in a data grid cluster, in accordance with an embodiment of the invention. As shown in FIG. 2, a data grid cluster 200 can use a buffer manager 201 to manage a buffer pool 210. The buffer pool 210 contains a plurality of buffers 220, each of which can contain one or more objects for the application 202.

The application 202 can send a buffer request 211 to the buffer manager 201 in the data grid cluster 200. The request 211 can include one or more parameters 221 that provide the buffer manager 201 with one or more indications on how big the buffer should be. Then, the buffer manager 201 can allocate a buffer 212 from the buffer pool 210 and return the buffer 212 to the application 202.

The buffer manager 201 can implement a flexible buffer management interface 204, e.g. a BufferManager interface in Oracle Coherence. Using the flexible buffer management interface 204, the buffer manager 201 is allowed to have flexibility in deciding which buffer can be provided to the application 202 to both satisfy the application's buffer request 211 and optimize the buffer management in the buffer pool 210. Thus, the allocated buffer 212 that is returned by the buffer manager 201 may not have the exact size as specified in the buffer request 211.

The flexible buffer management interface, e.g. a BufferManager interface in Oracle Coherence, can include different buffer acquisition methods for supporting different type buffer requests. These different buffer acquisition methods can take different parameters that provide indications on the size of the requested buffer.

For example, the buffer management interface can provide a method, e.g. an acquire( ) method as shown below, for requesting a buffer with a minimum size.

public java.nio.ByteBuffer acquire(int cbMin)

The acquire( ) method can take a parameter, cbMin, that defines the minimal required size of the requested buffer. Then, the buffer manager 201 can allocate a buffer for the requester, with the size of the allocated buffer to be equal to or more than the minimum size of the buffer. For example, the buffer manager 201 can return a ByteBuffer with Buffer.remaining( ) equal to cbMin. Also, if a larger buffer is returned, then the limit on the buffer can be pre-set to cbMin, but with the entire capacity being available to the requester.

Furthermore, the buffer management interface can provide a method, e.g. an acquirePref( ) method as shown below, for requesting a buffer with a preferred size.

public java.nio.ByteBuffer acquirePref(int cbPref)

The acquirePre( ) method can take a parameter, cbPref, that defines the preferred size of the requested buffer. Then, the buffer manager 201 can allocate a buffer for the requester, with the allocated buffer being in any size. For example, the buffer manager 201 can return a ByteBuffer with Buffer.remaining( ) less than or equal to cbPref.

The acquirePre( ) method allows the buffer manager 201 to satisfy a large memory request of a known size over a series of allocations. The requester, e.g. the application 202, can be provided with multiple buffers by making multiple buffer requests. Then, the requester can chain the series of buffers together to ultimately fulfill the required buffer size. Again, if a larger buffer is returned, then the limit on the buffer can be pre-set to cbPref, but with the entire capacity being available to the requester.

Also, the buffer management interface can provide a method, e.g. an acquireSum( ) method as shown below, to satisfy the allocation of a potentially large, but unknown size memory request, for instance, during the serialization of a complex object.

public java.nio.ByteBuffer acquireSum(int cbSum)

The acquireSum( ) method can take a parameter, cbSum, that defines the running total of prior acquisitions, or total size of the priorly acquired one or more buffers, and returns a buffer, e.g. a ByteBuffer, of any size back to the requester, e.g. the application 202.

For example, it is generally difficult to predict how large of a buffer is needed in order to perform an object serialization task, since the serialization of an object includes the serialization of every object that the object has a reference to. Using the acquireSum( ) method, the application 202 performing the object serialization task can simply tell the buffer manager how large of a buffer it has previously acquired. Then, based on the buffer usage information, the buffer manager 201 can decide what is the best size for the buffer that can be provided to the application.

In an exemplary use case, when an application 202 is serializing a software object with unknown buffer need, the buffer manage 201 can initially provide the application 202 with a 1K buffer, which can be followed by another 1K buffer and a 4K buffer upon receiving more requests from the application 202. If these three buffers provided by the buffer manage 201 can not satisfy the buffer need for serializing the software object, the buffer manage 201 can provide the application 202 with a larger buffer, e.g. a 64K buffer to allow the application 202 to serialize the software object that may require about 600K Bytes in memory.

Thus, the flexible buffer management interface can intelligently decide to increase the size of a buffer provided to an application 202, after receiving consecutive buffer requests from the same application 202. This can save the application 202 a number of trips for requesting more buffers when the buffer needs are difficult to predict. For example, in the above case, the buffer manage 201 can provide the application 202 with a 64K buffer after two consecutive 1K buffers and a 4K buffer, instead of six 10K buffers in a row.

Additionally, the buffer management interface provides a method, e.g. a release method( ) as shown below, that can release a formerly acquired ByteBuffer.

public void release(java.nio.ByteBuffer buffer)

The release ( ) method allows the buffer manager 201 to release a formerly acquired ByteBuffer, e.g. a ByteBuffer of any size. Here, the release ( ) method takes a parameter, buffer, that defines the formerly acquired ByteBuffer.

Figure 3:
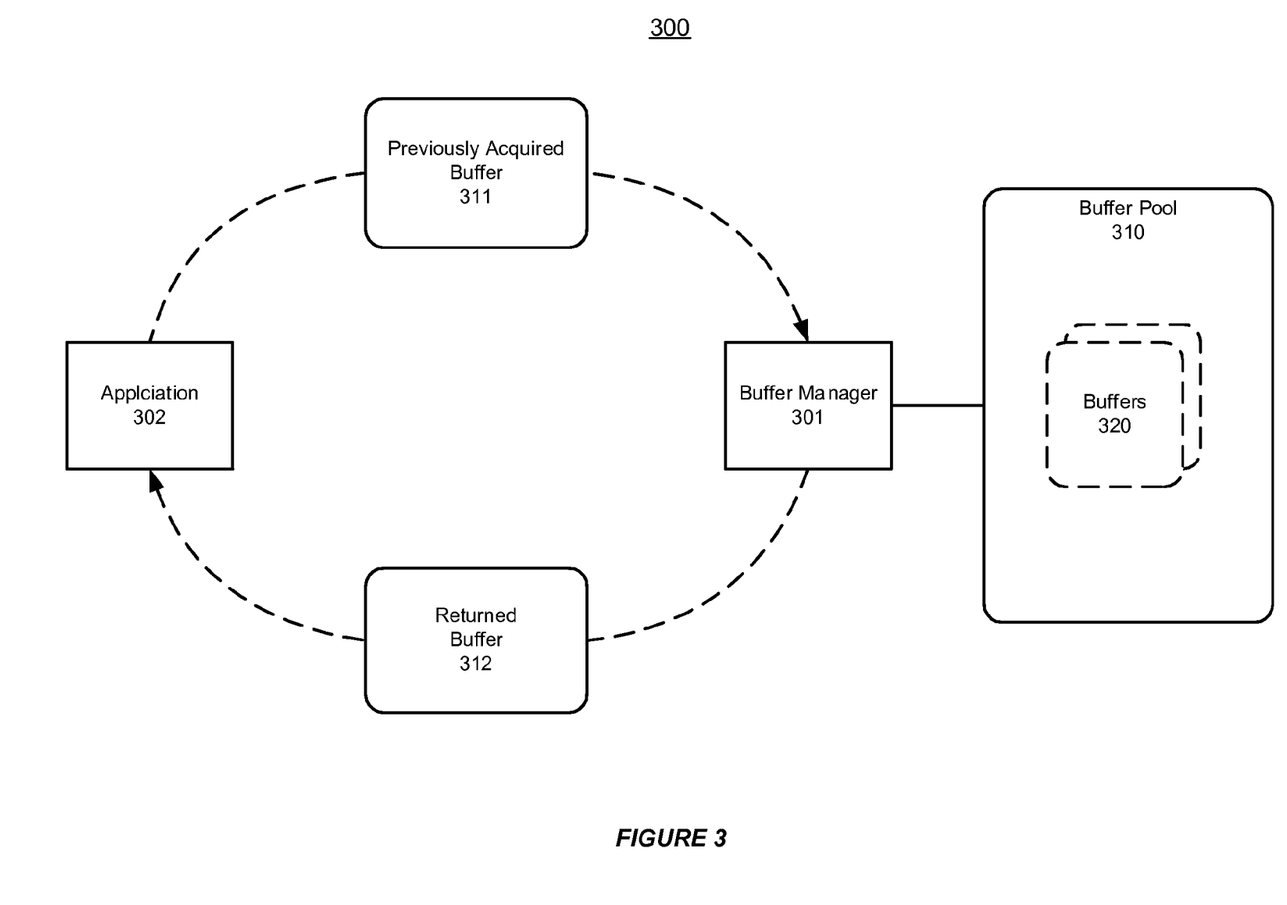
FIG. 3 shows an illustration of truncating a formerly acquired buffer in a data grid cluster, in accordance with an embodiment of the invention.

FIG. 3 shows an illustration of truncating a formerly acquired buffer in a data grid cluster 300, in accordance with an embodiment of the invention. As shown in FIG. 3, a data grid cluster 300 can use a buffer manager 301 to manage a buffer pool 310. The buffer pool 310 contains a plurality of buffers 320, each of which can contain one or more objects for the application 302.

The application 302 can send a previously acquired buffer 311, e.g. a ByteBuffer or a Byte Array, back to the buffer manager 201 in the data grid cluster 300 for possible truncating in order to optimize on the buffer usage. Then, the buffer manager 301 can return a buffer 312 to the application. Here, the returned buffer 312, can be either a new buffer, or the same buffer if no exchange is deemed necessary.

For example, the buffer management interface can provide a method, e.g. a truncate method( ) as shown below, that can truncate a previously acquired ByteBuffer.

public java.nio.ByteBuffer truncate(java.nio.ByteBuffer buff)

The truncate( ) method can take a previously acquired buffer 311 and can return a new buffer 312, the size of which closely matches the amount of space used, e.g., as indicated by Buffer.remaining( ) in the formerly allocated buffer. The returned buffer 312 can have the same number of remaining bytes as the previously acquired buffer 311 with the same content. In the case when a new buffer 312 is returned, the previously acquired buffer 311 can be automatically released to the buffer manager 301.

Using the truncate( ) method, the buffer manager 301 is responsible for deciding whether the formerly allocated buffer 311 needs to be truncated based on an evaluation of the trade off between the consumption of CPU time and the present memory usage in the buffer pool 310. For example, the buffer manager 301 may decide it is preferable to not truncate the buffer when the CPU is busy executing other tasks and there is abundant memory in the buffer pool 310.

Furthermore, the application 302 can decide when to ask the buffer manager 301 to truncate a previously acquired buffer 311, since the application 302 knows the actual buffer usage information based on the application logic. For example, the application 302 may decide to request the buffer manager 301 to truncate a previously acquired buffer 311, when the application 302 only use a small portion of the buffer and a full release of the resource is not foreseeable.

Figure 4:
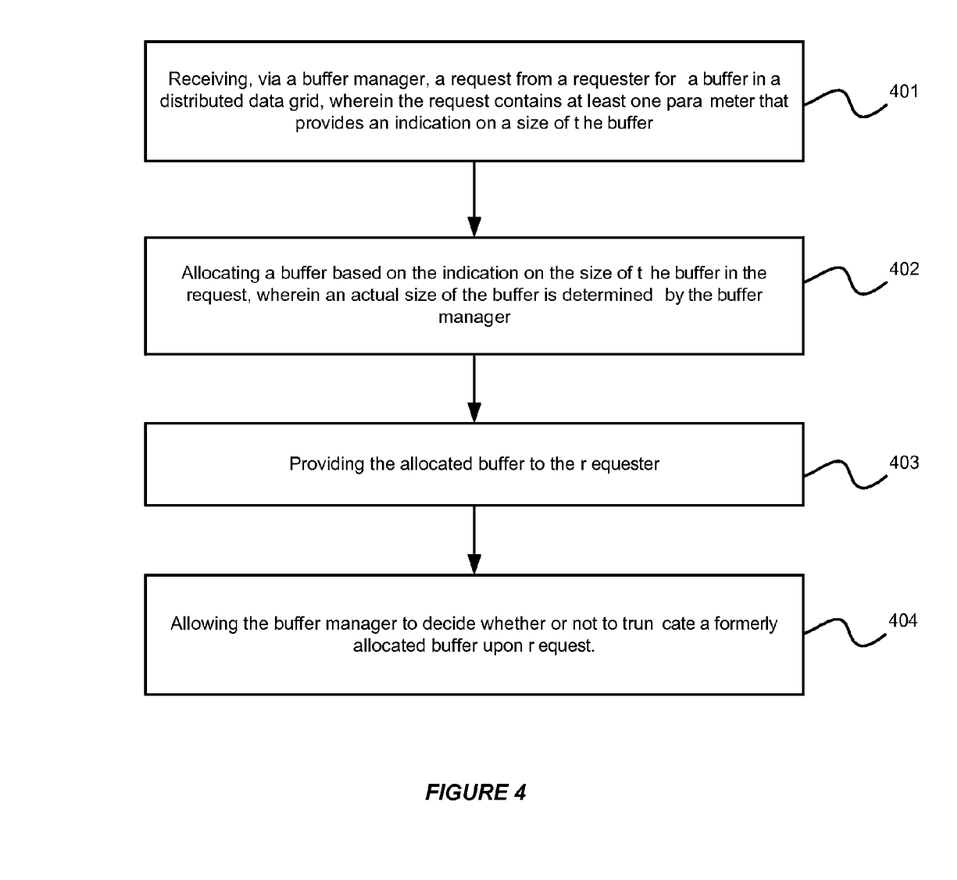
FIG. 4 illustrates an exemplary flow chart for handling a buffer request in a data grid cluster, in accordance with an embodiment of the invention.

FIG. 4 illustrates an exemplary flow chart for handling a buffer request in a data grid cluster, in accordance with an embodiment of the invention. As shown in FIG. 4, at step 401, a buffer manager can receive a request from a requester for a buffer in the distributed data grid, wherein the request contains at least one parameter that provides an indication on the size of the buffer. Then, at step 402, the buffer manager can allocate a buffer based on the indication on the size of the buffer in the request, wherein the actual size of the buffer is determined by the buffer manager. Furthermore, at step 403, the buffer manager can provide the allocated buffer to the requester. Additionally, at step 404, the buffer manager can decide whether or not to truncate a formerly allocated buffer upon request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing a flexible buffer management interface in a distributed data grid, comprising:
   providing a buffer manager operating on a distributed data grid;
   providing a flexible buffer management interface for said buffer manager, wherein the flexible buffer management interface defines a plurality of different buffer acquisition methods, wherein said plurality of different buffer acquisition methods include,
      a minimum buffer size method having a parameter which defines a minimum size of the requested buffer,
      a preferred buffer size method having a parameter which defines a preferred size of the requested buffer, and
      a running total buffer size method having a parameter which defines a total size of a previously acquired buffer;
   receiving, with said buffer manager, a request from a requester for a buffer in the distributed data grid, wherein the request comprises a particular buffer acquisition method of said plurality of different buffer acquisition methods and a particular parameter that provides an indication on a size of the buffer;
   allocating a buffer to the requestor based on the particular buffer acquisition method and the particular parameter, wherein
      if the particular buffer acquisition method is the minimum buffer size method, said buffer manager allocates an allocated buffer having a size not less than the minimum size specified by the particular parameter,
      if the particular buffer acquisition method is the preferred buffer size method, said buffer manager allocates an allocated buffer having a size which may be less than the preferred size defined by the particular parameter, and
      if the particular buffer acquisition method is the running total buffer size method, said buffer manager allocates an allocated buffer having a size determined based on the total size of a previously acquired buffer defined by the particular parameter, wherein if said buffer manager determines that said requestor has made a plurality of previous related buffer requests, the buffer manager allocates an allocated buffer at least twice as large as the size of a previously acquired buffer defined by the particular parameter; and
   providing the allocated buffer to the requester.

2. The method according to claim 1, wherein the plurality of different buffer acquisition methods further includes a pre-set buffer acquisition method in response to which said buffer manager can allocated a plurality of allocated buffers which allocated buffers are chained together by the requestor to satisfy a large memory request.

3. The method according to claim 1, wherein:
the plurality of different buffer acquisition methods further includes a truncate buffer acquisition method having a parameter which defines a used size of a previously allocated buffer; and
wherein if the particular buffer acquisition method is the truncate buffer acquisition method, said buffer manager allocates an allocated buffer having a size not less than the used size of a previously allocated buffer specified by the particular parameter,
wherein the method further comprises automatically releasing the previously allocated buffer to the buffer manager.

4. The method according to claim 3, further comprising:
making a determination with the buffer manager whether the previously allocated buffer needs to be truncated based on an evaluation of a trade off between consumption of CPU time and buffer memory availability.

5. The method according to claim 1, further comprising:
flexibly determining with the buffer manager an allocated buffer size in response to a request in order to satisfy the request and optimize management of available buffer memory.

6. The method according to claim 1, wherein the flexible buffer management interface can be utilized by requestors to support network input/output.

7. The method according to claim 1, wherein the flexible buffer management interface can be utilized by requestors to support object serialization.

8. The method according to claim 1, wherein the distributed data grid comprises a buffer pool comprising a plurality of buffers and wherein said buffer manager allocates available buffers from the buffer pool.

9. The method according to claim 1, wherein the requestor is an application operating in said distributed data grid.

10. A system for providing a flexible buffer management interface in a distributed data grid, comprising:
a buffer manager operating on a distributed data grid;
a flexible buffer management interface for said buffer manager, wherein the flexible buffer management interface defines a plurality of different buffer acquisition methods, wherein said plurality of different buffer acquisition methods include,
a minimum buffer size method having a parameter which defines a minimum size of the requested buffer,
a preferred buffer size method having a parameter which defines a preferred size of the requested buffer, and
a running total buffer size method having a parameter which defines a total size of a previously acquired buffer;
wherein said buffer manager is configured to receive a request from a requester for a buffer in the distributed data grid, wherein the request comprises a particular buffer acquisition method of said plurality of different buffer acquisition methods and a particular parameter that provides an indication on a size of the buffer;
wherein said buffer manager is configured, in response to receiving a request, to allocate a buffer to the requestor based on the particular buffer acquisition method and the particular parameter, and provide an allocated buffer to the requestor, wherein
if the particular buffer acquisition method is the minimum buffer size method, said buffer manager allocates an allocated buffer having a size not less than the minimum size specified by the particular parameter,
if the particular buffer acquisition method is the preferred buffer size method, said buffer manager allocates an allocated buffer having a size which may be less than the preferred size defined by the particular parameter, and
if the particular buffer acquisition method is the running total buffer size method, said buffer manager allocates an allocated buffer having a size determined based on the total size of a previously acquired buffer defined by the particular parameter, wherein if said buffer manager determines that said requestor has made a plurality of previous related buffer requests, the buffer manager allocates an allocated buffer at least twice as large as the size of a previously acquired buffer defined by the particular parameter.

11. The system according to claim 10, wherein the plurality of different buffer acquisition methods further includes a pre-set buffer acquisition method in response to which said buffer manager can allocate a plurality of allocated buffers which allocated buffers are chained together by the requestor to satisfy a large memory request.

12. The system according to claim 10, wherein:
the plurality of different buffer acquisition methods further includes a truncate buffer acquisition method having a parameter which defines a used size of a previously allocated buffer; and
wherein if the particular buffer acquisition method is the truncate buffer acquisition method, said buffer manager allocates an allocated buffer having a size not less than the used size of a previously allocated buffer specified by the particular parameter and wherein the previously allocated buffer is automatically releasing to the buffer manager.

13. The system according to claim 12, wherein:
the buffer manager is configured to determine with whether the previously allocated buffer needs to be truncated based on an evaluation of a trade off between consumption of CPU time and buffer memory availability.

14. The system according to claim 10, wherein:
the buffer manager is configured to flexibly determine an allocated buffer size in response to a request in order to satisfy the request and optimize management of available buffer memory.

15. The system according to claim 10, wherein the flexible buffer management interface is configured to be utilized by requestors to support network input/output.

16. The system according to claim 10, wherein the flexible buffer management interface is configured to be utilized by requestors to support object serialization.

17. The method according to claim 10, wherein the distributed data grid comprises a buffer pool comprising a plurality of buffers and wherein said buffer manager allocates available buffers from the buffer pool.

18. A non-transitory computer readable storage medium having instructions stored thereon that when executed by one or more processor cause said one or more processor to perform the steps of:
providing a buffer manager operating on a distributed data grid;
providing a flexible buffer management interface for said buffer manager, wherein the flexible buffer management interface defines a plurality of different buffer acquisition methods, wherein said plurality of different buffer acquisition methods include,
a minimum buffer size method having a parameter which defines a minimum size of the requested buffer, a preferred buffer size method having a parameter which defines a preferred size of the requested buffer, and a running total buffer size method having a parameter which defines a total size of a previously acquired buffer;

receiving, with said buffer manager, a request from a requester for a buffer in the distributed data grid, wherein the request comprises a particular buffer acquisition method of said plurality of different buffer acquisition methods and a particular parameter that provides an indication on a size of the buffer; and allocating a buffer to the requestor based on the particular buffer acquisition method and the particular parameter, wherein if the particular buffer acquisition method is the minimum buffer size method, said buffer manager allocates an allocated buffer having a size not less than the minimum size specified by the particular parameter, if the particular buffer acquisition method is the preferred buffer size method, said buffer manager allocates an allocated buffer having a size which may be less than the preferred size defined by the particular parameter, and if the particular buffer acquisition method is the running total buffer size method, said buffer manager allocates an allocated buffer having a size determined based on the total size of a previously acquired buffer defined by the particular parameter, wherein if said buffer manager determines that said requestor has made a plurality of previous related buffer requests, the buffer manager allocates an allocated buffer at least twice as large as the size of a previously acquired buffer defined by the particular parameter; and providing the allocated buffer to the requester.

* * * * *

UNITED STATES PATENT AND TRADEMARK OFFICE
CERTIFICATE OF CORRECTION

| | | |
|---|---|---|
| PATENT NO. | : 8,874,811 B2 | Page 1 of 1 |
| APPLICATION NO. | : 13/671441 | |
| DATED | : October 28, 2014 | |
| INVENTOR(S) | : Helin et al. | |

It is certified that error appears in the above-identified patent and that said Letters Patent is hereby corrected as shown below:

In the Drawings

In drawing 4 of 4, in figure 4, under Reference Numeral 401, line 2, delete "para meter" and insert -- parameter --, therefor.

In drawing 4 of 4, in figure 4, under Reference Numeral 401, line 3, delete "of t he" and insert -- of the --, therefor.

In drawing 4 of 4, in figure 4, under Reference Numeral 402, line 1, delete "of t he" and insert -- of the --, therefor.

In the Specification

In column 3, line 64, delete "The acquirePre()" and insert -- The acquirePref() --, therefor.

In column 4, line 3, delete "The acquirePre()" and insert -- The acquirePref() --, therefor.

In column 4, line 39, delete "can not" and insert -- cannot --, therefor.

In the Claims

In column 6, line 67, in Claim 2, delete "allocated" and insert -- allocate --, therefor.

Signed and Sealed this
Twenty-third Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,874,811 B2
APPLICATION NO. : 13/671441
DATED : October 28, 2014
INVENTOR(S) : Helin et al.

It is certified that error appears in the above-identified patent and that said Letters Patent is hereby corrected as shown below:

On the title page, in the illustrative figure, under Reference Numeral 401, line 2, delete "para meter" and insert -- parameter --.

On the title page, in the illustrative figure, under Reference Numeral 401, line 3, delete "oft he" and insert -- of the --.

On the title page, in the illustrative figure, under Reference Numeral 402, line 1, delete "oft he" and insert -- of the --.

In the Drawings

In drawing 4 of 4, in figure 4, under Reference Numeral 401, line 2, delete "para meter" and insert -- parameter --, therefor.

In drawing 4 of 4, in figure 4, under Reference Numeral 401, line 3, delete "of t he" and insert -- of the --, therefor.

In drawing 4 of 4, in figure 4, under Reference Numeral 402, line 1, delete "of t he" and insert -- of the --, therefor.

In the Specification

In column 3, line 64, delete "The acquirePre()" and insert -- The acquirePref() --, therefor.

This certificate supersedes the Certificate of Correction issued June 30, 2015.

Signed and Sealed this
Fourth Day of August, 2015

Michelle K. Lee
*Director of the United States Patent and Trademark Office*

CERTIFICATE OF CORRECTION (continued)
U.S. Pat. No. 8,874,811 B2

In column 4, line 3, delete "The acquirePre()" and insert -- The acquirePref() --, therefor.

In column 4, line 39, delete "can not" and insert -- cannot --, therefor.

In the Claims

In column 6, line 67, in Claim 2, delete "allocated" and insert -- allocate --, therefor.